US009322162B2

(12) United States Patent
Olofsson et al.

(10) Patent No.: US 9,322,162 B2
(45) Date of Patent: *Apr. 26, 2016

(54) GUIDING MEANS AT A JOINT (75) Inventors: Ola Olofsson, Trelleborg (SE); Ulf Palmblad, Lund (SE)

(73) Assignee: PERGO (EUROPE) AB, Trelleborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/204,481

(22) Filed: Aug. 5, 2011

(65) Prior Publication Data

US 2011/0293361 A1    Dec. 1, 2011

Related U.S. Application Data (63) Continuation of application No. 09/910,690, filed on Jul. 24, 2001, now Pat. No. 7,992,358, which is a continuation-in-part of application No. 09/601,573, filed as application No. PCT/SE99/00128 on Feb. 1, 1999, now abandoned.

(30) Foreign Application Priority Data

Feb. 4, 1998 (SE) ...................................... 9800311

(51) Int. Cl.
E04B 1/00 (2006.01)
E04B 1/61 (2006.01)
E04F 15/04 (2006.01)

(52) U.S. Cl.
CPC ............... *E04B 1/6125* (2013.01); *E04F 15/04* (2013.01); *E04F 2201/0107* (2013.01); *E04F 2201/041* (2013.01); *Y10T 403/471* (2015.01); *Y10T 403/473* (2015.01); *Y10T 403/7094* (2015.01)

(58) Field of Classification Search
None
See application file for complete search history.

(56) References Cited

U.S. PATENT DOCUMENTS

| 208,036 A | 9/1878 | Robley |
| 213,740 A | 4/1879 | Conner |
| 308,313 A | 11/1884 | Gerike |
| 342,529 A | 5/1886 | McRae |
| 662,458 A | 11/1900 | Nagel |
| 714,987 A | 12/1902 | Wolfe |
| 752,694 A | 2/1904 | Lund |
| 753,791 A | 3/1904 | Fulghum |
| 769,355 A | 9/1904 | Platow |

(Continued)

FOREIGN PATENT DOCUMENTS

| AT | 002214 | 6/1998 |
| AU | 199732569 | 12/1999 |

(Continued)

OTHER PUBLICATIONS

ProQuest printout of "Appliance wide joint" SE199800311D0 [online], document shows a gazette announcement/publication date of Feb. 4, 1998, [retrieved Apr. 18, 2014]. Retrievedd from the Internet:<URL: http://search.proquest.com/professional/docview/1405937750?accountid=161361>.*

(Continued)

*Primary Examiner* — Victor MacArthur
(74) *Attorney, Agent, or Firm* — Jenkins, Wilson, Taylor & Hunt, P.A.

(57) ABSTRACT

A guiding means at a joint including groove and tenon preferably intended to be joined with glue. The tenon and/or groove includes guiding wedges.

4 Claims, 2 Drawing Sheets (56) References Cited

U.S. PATENT DOCUMENTS

| | | |
|---|---|---|
| 832,003 A | 9/1906 | Torrence |
| 847,272 A | 3/1907 | Ayers |
| 877,639 A | 1/1908 | Galbraith |
| 898,381 A | 9/1908 | Mattison |
| 1,000,859 A | 8/1911 | Vaughan |
| 1,002,102 A | 8/1911 | Weedon |
| 1,016,383 A | 2/1912 | Wellman |
| 1,097,986 A | 5/1914 | Moritz |
| 1,124,226 A | 1/1915 | Houston |
| 1,124,228 A | 1/1915 | Houston |
| 1,137,197 A | 4/1915 | Ellis |
| 1,140,958 A | 5/1915 | Cowan |
| 1,266,253 A | 5/1918 | Hakason |
| 1,319,286 A | 10/1919 | Johnson et al. |
| 1,357,713 A | 11/1920 | Lane |
| 1,407,679 A | 2/1922 | Ruchrauff |
| 1,454,250 A | 5/1923 | Parsons |
| 1,468,288 A | 9/1923 | Fen |
| 1,510,924 A | 10/1924 | Daniels et al. |
| 1,540,128 A | 6/1925 | Houston |
| 1,575,821 A | 3/1926 | Daniels |
| 1,576,527 A | 3/1926 | McBride |
| 1,576,821 A | 3/1926 | Daniels |
| 1,602,256 A | 10/1926 | Sellin |
| 1,602,267 A | 10/1926 | Karwisde |
| 1,615,096 A | 1/1927 | Myers |
| 1,622,103 A | 3/1927 | Fulton |
| 1,622,104 A | 3/1927 | Fulton |
| 1,637,634 A | 8/1927 | Carter |
| 1,644,710 A | 10/1927 | Crooks |
| 1,657,159 A | 1/1928 | Greenebaum |
| 1,660,480 A | 2/1928 | Daniels |
| 1,706,924 A | 3/1929 | Kane |
| 1,714,738 A | 5/1929 | Smith |
| 1,718,702 A | 6/1929 | Pfiester |
| 1,734,826 A | 11/1929 | Pick |
| 1,736,539 A | 11/1929 | Lachman |
| 1,764,331 A | 6/1930 | Moratz |
| 1,772,417 A | 8/1930 | Ellinwood |
| 1,776,188 A | 9/1930 | Langbaum |
| 1,823,039 A | 9/1930 | Gruner |
| 1,778,069 A | 10/1930 | Fetz |
| 1,787,027 A | 12/1930 | Wasleff |
| 1,801,093 A | 4/1931 | Larkins |
| 1,843,024 A | 1/1932 | Werner |
| 1,854,396 A | 4/1932 | Davis |
| 1,859,667 A | 5/1932 | Gruner |
| 1,898,364 A | 2/1933 | Gynn |
| 1,906,411 A | 5/1933 | Potvin |
| 1,913,342 A | 6/1933 | Schaffert |
| 1,929,871 A | 10/1933 | Jones |
| 1,940,377 A | 12/1933 | Storm |
| 1,946,646 A * | 2/1934 | Storm ............................. 52/393 |
| 1,953,306 A | 4/1934 | Moratz |
| 1,966,020 A | 7/1934 | Rowley |
| 1,978,075 A | 10/1934 | Butterworth |
| 1,986,739 A | 1/1935 | Mitte |
| 1,988,201 A | 1/1935 | Hall |
| 1,991,701 A | 2/1935 | Roman |
| 2,004,193 A | 6/1935 | Cherry |
| 2,015,813 A | 10/1935 | Nielson |
| 2,027,292 A | 1/1936 | Rockwell |
| 2,044,216 A | 6/1936 | Klages |
| 2,045,067 A | 6/1936 | Bruce |
| 2,049,571 A | 8/1936 | Schuck |
| 2,100,238 A | 11/1937 | Burgess |
| 2,126,956 A | 8/1938 | Gilbert |
| 2,138,085 A | 11/1938 | Birtles |
| 2,141,708 A | 12/1938 | Elmendorf |
| 2,142,305 A | 1/1939 | Davis |
| 2,194,086 A | 3/1940 | Horn |
| 2,199,938 A | 5/1940 | Kloote |
| 2,222,137 A | 11/1940 | Bruce |
| 2,238,169 A | 4/1941 | Heyn et al. |
| 2,245,497 A | 6/1941 | Potchen |
| 2,253,943 A | 8/1941 | Rice |
| 2,266,464 A | 12/1941 | Kraft |
| 2,276,071 A | 3/1942 | Scull |
| 2,280,071 A | 4/1942 | Hamilton |
| 2,282,559 A | 5/1942 | Byers |
| 2,324,628 A | 7/1943 | Kahr |
| 2,363,429 A | 11/1944 | Lowry |
| 2,398,632 A | 4/1946 | Frost et al. |
| 2,405,602 A | 8/1946 | Nugent |
| 2,430,200 A | 11/1947 | Wilson |
| 2,487,571 A | 11/1949 | Maxwell |
| 2,491,498 A | 12/1949 | Kahr |
| 2,644,552 A | 7/1953 | MacDonald |
| 2,717,420 A | 9/1955 | Georges |
| 2,729,584 A | 1/1956 | Foster |
| 2,740,167 A | 4/1956 | Rowley |
| 2,780,253 A | 2/1957 | Joa |
| 2,808,624 A | 10/1957 | Sullivan |
| 2,823,433 A | 2/1958 | Kendall |
| 2,839,790 A | 6/1958 | Collings |
| 2,857,302 A | 10/1958 | Burton et al. |
| 2,863,185 A | 12/1958 | Reidl |
| 2,865,058 A | 12/1958 | Andersson et al. |
| 2,878,530 A | 3/1959 | Hilding |
| 2,894,292 A | 7/1959 | Gramelspacher |
| 2,926,401 A | 3/1960 | Place |
| 2,831,223 A | 9/1960 | DeShazor |
| 2,952,341 A | 9/1960 | Weiler |
| 2,996,751 A | 8/1961 | Roby |
| 3,045,294 A | 7/1962 | Livezey, Jr. |
| 3,090,082 A | 5/1963 | Bauman |
| 3,100,556 A | 8/1963 | Ridder |
| 3,125,138 A | 3/1964 | Boldenbach |
| 3,128,851 A | 4/1964 | Deridder et al. |
| 3,141,392 A | 7/1964 | Schneider |
| 3,148,482 A | 9/1964 | Neale |
| 3,162,906 A | 12/1964 | Dudley |
| 3,182,769 A | 5/1965 | De Ridder |
| 3,199,258 A | 8/1965 | Jentoft et al. |
| 3,203,149 A | 8/1965 | Soddy |
| 3,204,380 A | 9/1965 | Wilson |
| 3,253,377 A | 5/1966 | Schakel |
| 3,257,225 A | 6/1966 | Marotta |
| 3,267,630 A | 8/1966 | Omholt |
| 3,282,010 A | 11/1966 | King, Jr. |
| 3,286,425 A | 11/1966 | Brown |
| 3,296,056 A | 1/1967 | Bechtold |
| 3,301,147 A | 1/1967 | Clayton et al. |
| 3,310,919 A | 3/1967 | Bue |
| 3,331,171 A | 7/1967 | Hallock |
| 3,339,329 A | 9/1967 | Berg |
| 3,347,048 A | 10/1967 | Brown et al. |
| 3,362,127 A | 1/1968 | McGowan |
| 3,363,381 A | 1/1968 | Forrest |
| 3,363,382 A | 1/1968 | Forrest |
| 3,363,383 A | 1/1968 | La Barge |
| 3,373,071 A | 3/1968 | Fuerst |
| 3,377,931 A | 4/1968 | Hilton |
| 3,387,422 A | 6/1968 | Wanzer |
| 3,397,496 A | 8/1968 | Sohns |
| 3,444,660 A | 5/1969 | Feichter |
| 3,449,879 A | 6/1969 | Bloom |
| 3,460,304 A | 8/1969 | Braeuninger et al. |
| 3,473,278 A | 10/1969 | Gossen |
| 3,474,584 A | 10/1969 | Lynch |
| 3,479,784 A | 11/1969 | Massagli |
| 3,481,810 A | 12/1969 | Waite |
| 3,488,828 A | 1/1970 | Gallagher |
| 3,496,119 A | 2/1970 | Fitzgerald |
| 3,508,369 A | 4/1970 | Tennison |
| 3,526,420 A | 9/1970 | Brancaleone |
| 3,535,844 A | 10/1970 | Glaros |
| 3,538,665 A | 11/1970 | Gohner |
| 3,538,819 A | 11/1970 | Gould et al. |
| 3,553,919 A | 1/1971 | Omholt |
| 3,555,762 A | 1/1971 | Costanzo, Jr. |
| 3,570,205 A | 3/1971 | Payne |
| 3,572,224 A | 3/1971 | Perry |
| 3,579,941 A | 5/1971 | Tibbals |

(56) References Cited

U.S. PATENT DOCUMENTS

| | | |
|---|---|---|
| 3,619,964 A | 11/1971 | Passaro et al. |
| 3,627,362 A | 12/1971 | Brenneman |
| 3,657,852 A | 4/1972 | Worthington et al. |
| 3,665,666 A | 5/1972 | Delcroix |
| 3,671,369 A | 6/1972 | Kvalheim et al. |
| 3,687,773 A | 8/1972 | Wangborg |
| 3,694,983 A | 10/1972 | Couquet |
| 3,696,575 A | 10/1972 | Armstrong |
| 3,707,061 A | 12/1972 | Collette et al. |
| 3,714,747 A | 2/1973 | Curran |
| 3,720,027 A | 3/1973 | Christensen |
| 3,731,445 A | 5/1973 | Hoffmann et al. |
| 3,745,726 A | 7/1973 | Thom |
| 3,758,650 A | 9/1973 | Hurst |
| 3,759,007 A | 9/1973 | Thiele |
| 3,760,544 A | 9/1973 | Hawes et al. |
| 3,768,846 A | 10/1973 | Hensley et al. |
| 3,778,958 A | 12/1973 | Fowler |
| 3,798,111 A | 3/1974 | Lane et al. |
| 3,807,113 A | 4/1974 | Turner |
| 3,808,030 A | 4/1974 | Bell |
| 3,810,707 A | 5/1974 | Tungseth et al. |
| 3,849,240 A | 11/1974 | Mikulak |
| 3,859,000 A | 1/1975 | Webster |
| 3,884,328 A | 5/1975 | Williams |
| 3,902,293 A | 9/1975 | Witt et al. |
| 3,908,053 A | 9/1975 | Hettich |
| 3,908,062 A | 9/1975 | Roberts |
| 3,921,312 A | 11/1975 | Fuller |
| 3,936,551 A | 2/1976 | Elmendorf et al. |
| 3,953,661 A | 4/1976 | Gulley |
| 3,988,187 A | 10/1976 | Witt et al. |
| 4,059,933 A | 11/1977 | Funk et al. |
| 4,060,437 A | 11/1977 | Strout |
| 4,065,902 A | 1/1978 | Lindal |
| 4,067,155 A | 1/1978 | Ruff et al. |
| 4,074,496 A | 2/1978 | Fischer |
| 4,090,338 A | 5/1978 | Bourgade |
| 4,099,358 A | 7/1978 | Compaan |
| 4,143,498 A * | 3/1979 | Martin et al. ................. 52/506.1 |
| 4,144,689 A | 3/1979 | Bains |
| 4,150,517 A | 4/1979 | Warner |
| 4,158,335 A | 6/1979 | Belcastro |
| 4,164,832 A | 8/1979 | Van Zandt |
| 4,169,688 A | 10/1979 | Toshio |
| 4,186,539 A | 2/1980 | Harmon et al. |
| 4,198,455 A | 4/1980 | Spiro et al. |
| 4,242,390 A | 12/1980 | Nemeth |
| 4,247,390 A | 1/1981 | Knoll |
| 4,292,774 A | 10/1981 | Mairle |
| 4,299,070 A | 11/1981 | Oltmanns et al. |
| 4,316,351 A | 2/1982 | Ting |
| 4,376,593 A | 3/1983 | Schaefer |
| 4,390,580 A | 6/1983 | Donovan et al. |
| 4,426,820 A | 1/1984 | Terbrack et al. |
| 4,449,346 A | 5/1984 | Tremblay |
| 4,455,803 A | 6/1984 | Kornberger |
| 4,461,131 A | 7/1984 | Pressell |
| 4,471,012 A | 9/1984 | Maxwell |
| 4,501,102 A | 2/1985 | Knowles |
| 4,504,347 A | 3/1985 | Munk et al. |
| 4,505,887 A | 3/1985 | Miyata et al. |
| 4,520,062 A | 5/1985 | Ungar et al. |
| 4,561,233 A | 12/1985 | Harter et al. |
| 4,571,910 A | 2/1986 | Cosentino |
| 4,594,347 A | 6/1986 | Ishikawa et al. |
| 4,599,124 A | 7/1986 | Kelly et al. |
| 4,599,841 A | 7/1986 | Haid |
| 4,599,842 A | 7/1986 | Counihan |
| 4,612,745 A | 9/1986 | Hovde |
| 4,621,471 A | 11/1986 | Kuhr et al. |
| 4,641,469 A | 2/1987 | Wood |
| 4,643,237 A | 2/1987 | Rosa |
| 4,653,138 A | 3/1987 | Carder |
| 4,653,242 A | 3/1987 | Ezard |
| 4,672,728 A | 6/1987 | Nimberger |
| 4,683,631 A | 8/1987 | Dobbertin |
| 4,703,597 A | 11/1987 | Eggemar |
| 4,715,162 A | 12/1987 | Brightwell |
| 4,733,510 A | 3/1988 | Werner |
| 4,736,563 A | 4/1988 | Bilhorn |
| 4,738,071 A | 4/1988 | Ezard |
| 4,747,197 A | 5/1988 | Charron |
| 4,757,657 A | 7/1988 | Mitchell |
| 4,757,658 A | 7/1988 | Kaempen |
| 4,769,963 A | 9/1988 | Meyerson |
| 4,796,402 A | 1/1989 | Pajala |
| 4,806,435 A | 2/1989 | Athey |
| 4,819,932 A | 4/1989 | Trotter, Jr. |
| 4,831,806 A | 5/1989 | Niese et al. |
| 4,844,972 A | 7/1989 | Tedeschi et al. |
| 4,845,907 A | 7/1989 | Meek |
| 4,893,449 A | 1/1990 | Kemper |
| 4,894,272 A | 1/1990 | Aisley |
| 4,905,442 A | 3/1990 | Daniels |
| 4,910,280 A | 3/1990 | Robbins, III |
| 4,920,626 A | 5/1990 | Nimberger |
| 4,940,503 A | 7/1990 | Lindgren et al. |
| 4,952,775 A | 8/1990 | Yokoyama et al. |
| 4,953,335 A | 9/1990 | Kawaguchi et al. |
| 4,988,131 A | 1/1991 | Wilson et al. |
| 4,998,395 A | 3/1991 | Bezner |
| 4,998,396 A | 3/1991 | Palmersten |
| 5,003,016 A | 3/1991 | Boeder |
| 5,029,425 A | 7/1991 | Bogataj |
| 5,034,272 A | 7/1991 | Lindgren et al. |
| 5,050,362 A | 9/1991 | Tal et al. |
| 5,070,662 A | 12/1991 | Niese |
| 5,074,089 A | 12/1991 | Kemmer et al. |
| 5,086,599 A | 2/1992 | Meyerson |
| 5,092,095 A | 3/1992 | Zadok |
| 5,113,632 A | 5/1992 | Hanson |
| 5,117,603 A | 6/1992 | Weintraub |
| 5,138,812 A | 8/1992 | Palmersten |
| 5,148,850 A | 9/1992 | Urbanick |
| 5,155,952 A | 10/1992 | Herwegh et al. |
| 5,165,816 A | 11/1992 | Parasin |
| 5,179,811 A | 1/1993 | Walker et al. |
| 5,179,812 A | 1/1993 | Hill |
| 5,216,861 A | 6/1993 | Meyerson |
| 5,244,303 A | 9/1993 | Hair |
| 5,247,773 A | 9/1993 | Weir |
| 5,253,464 A | 10/1993 | Nilsen |
| 5,259,162 A | 11/1993 | Nicholas |
| 5,271,564 A | 12/1993 | Smith |
| 5,274,979 A | 1/1994 | Tsai |
| 5,292,155 A | 3/1994 | Bell et al. |
| 5,295,341 A | 3/1994 | Kajiwara |
| 5,325,649 A | 7/1994 | Kajiwara |
| 5,343,665 A | 9/1994 | Palmersten |
| 5,344,700 A | 9/1994 | McGath et al. |
| 5,348,778 A | 9/1994 | Knipp et al. |
| 5,349,796 A | 9/1994 | Meyerson |
| 5,359,817 A | 11/1994 | Fulton |
| 5,365,713 A | 11/1994 | Nicholas et al. |
| 5,390,457 A | 2/1995 | Sjolander |
| 5,424,118 A | 6/1995 | McLaughlin |
| 5,433,048 A | 7/1995 | Strasser |
| 5,433,806 A | 7/1995 | Pasquali et al. |
| 5,474,831 A | 12/1995 | Nystrom |
| 5,497,589 A | 3/1996 | Porter |
| 5,502,939 A | 4/1996 | Zadok et al. |
| 5,527,128 A | 6/1996 | Rope et al. |
| 5,540,025 A | 7/1996 | Takehara et al. |
| D373,203 S | 8/1996 | Kornfalt |
| 5,567,497 A | 10/1996 | Zegler et al. |
| 5,570,554 A | 11/1996 | Searer |
| 5,581,967 A | 12/1996 | Glatz |
| 5,597,024 A | 1/1997 | Bolyard et al. |
| 5,618,602 A | 4/1997 | Nelson |
| 5,618,612 A | 4/1997 | Gstrein |
| 5,623,799 A | 4/1997 | Kowalski |
| 5,630,304 A | 5/1997 | Austin |
| 5,657,598 A | 8/1997 | Wilbs et al. |

(56) References Cited

U.S. PATENT DOCUMENTS

| | | |
|---|---|---|
| 5,671,575 A | 9/1997 | Wu |
| 5,685,117 A | 11/1997 | Nicholson |
| 5,688,569 A | 11/1997 | Gilmore et al. |
| 5,692,354 A | 12/1997 | Searer |
| 5,695,875 A | 12/1997 | Larsson et al. |
| 5,706,621 A | 1/1998 | Pervan |
| 5,706,623 A | 1/1998 | Brown |
| 5,719,239 A | 2/1998 | Mirous et al. |
| 5,735,092 A | 4/1998 | Clayton et al. |
| 5,736,227 A | 4/1998 | Sweet et al. |
| 5,765,808 A | 6/1998 | Butschbacher et al. |
| 5,791,114 A | 8/1998 | Mandel |
| 5,797,237 A | 8/1998 | Finkell, Jr. |
| 5,823,240 A | 10/1998 | Bolyard et al. |
| 5,827,592 A | 10/1998 | Van Gulik et al. |
| 5,860,267 A | 1/1999 | Pervan |
| 5,888,017 A | 3/1999 | Corrie |
| 5,894,701 A | 4/1999 | Delorme |
| 5,904,019 A | 5/1999 | Kooij et al. |
| 5,907,934 A | 6/1999 | Austin |
| 5,930,947 A | 8/1999 | Eckhoff |
| 5,931,447 A | 8/1999 | Butschbacher et al. |
| 5,935,668 A | 8/1999 | Smith |
| 5,941,047 A | 8/1999 | Johansson |
| 5,943,239 A | 8/1999 | Shamblin et al. |
| 5,945,181 A | 8/1999 | Fisher |
| 5,950,389 A | 9/1999 | Porter |
| 5,968,625 A | 10/1999 | Hudson |
| 5,971,655 A | 10/1999 | Shirakawa |
| 5,987,839 A | 11/1999 | Hamar et al. |
| 5,987,845 A | 11/1999 | Laronde |
| 5,996,301 A | 12/1999 | Conterno |
| 6,006,486 A | 12/1999 | Moriau et al. |
| 6,012,263 A | 1/2000 | Church et al. |
| 6,021,615 A | 2/2000 | Brown |
| 6,021,646 A | 2/2000 | Burley |
| 6,023,907 A | 2/2000 | Pervan |
| 6,029,416 A | 2/2000 | Andersson |
| 6,079,182 A | 6/2000 | Ellenberger |
| 6,094,882 A | 8/2000 | Pervan |
| 6,101,778 A | 8/2000 | Martensson |
| 6,119,423 A | 9/2000 | Costantino |
| 6,134,854 A | 10/2000 | Stanchfield |
| 6,141,920 A | 11/2000 | Kemper |
| 6,143,119 A | 11/2000 | Seidner |
| 6,148,884 A | 11/2000 | Bolyard et al. |
| 6,158,915 A | 12/2000 | Kise |
| 6,182,410 B1 | 2/2001 | Pervan |
| 6,182,413 B1 | 2/2001 | Magnusson |
| 6,189,283 B1 | 2/2001 | Bentley |
| 6,205,639 B1 | 3/2001 | Pervan |
| 6,209,278 B1 | 4/2001 | Tychsen |
| 6,216,403 B1 | 4/2001 | Belbeoc'h |
| 6,216,409 B1 | 4/2001 | Roy et al. |
| 6,219,982 B1 | 4/2001 | Eyring |
| 6,230,385 B1 | 5/2001 | Nelson |
| 6,233,899 B1 | 5/2001 | Mellert et al. |
| 6,247,285 B1 | 6/2001 | Moebus |
| 6,253,514 B1 | 7/2001 | Jobe et al. |
| 6,314,701 B1 | 11/2001 | Meyerson |
| 6,324,803 B1 | 12/2001 | Pervan |
| 6,324,809 B1 | 12/2001 | Nelson |
| 6,332,733 B1 | 12/2001 | Hamberger et al. |
| 6,345,480 B1 | 2/2002 | Kemper |
| 6,345,481 B1 | 2/2002 | Nelson |
| 6,363,677 B1 | 4/2002 | Chen et al. |
| 6,365,258 B1 | 4/2002 | Alm |
| 6,385,936 B1 | 5/2002 | Schneider |
| 6,397,547 B1 | 6/2002 | Martensson |
| 6,418,683 B1 | 7/2002 | Martensson et al. |
| 6,421,970 B1 | 7/2002 | Martensson et al. |
| 6,423,257 B1 | 7/2002 | Stobart |
| 6,438,919 B1 | 8/2002 | Knauseder |
| 6,446,405 B1 | 9/2002 | Pervan |
| 6,505,452 B1 | 1/2003 | Hannig et al. |
| 6,510,665 B2 | 1/2003 | Pervan |
| 6,516,579 B1 | 2/2003 | Pervan |
| 6,517,935 B1 | 2/2003 | Kornfalt et al. |
| 6,532,709 B2 | 3/2003 | Pervan |
| 6,536,178 B1 | 3/2003 | Palsson |
| 6,550,205 B2 | 4/2003 | Neuhofer |
| 6,588,165 B1 | 7/2003 | Wright |
| 6,588,166 B2 | 7/2003 | Martensson et al. |
| 6,591,568 B1 | 7/2003 | Palsson |
| 6,601,359 B2 | 8/2003 | Olofsson |
| 6,606,834 B2 | 8/2003 | Martensson et al. |
| 6,647,690 B1 | 11/2003 | Martensson |
| 6,672,030 B2 | 1/2004 | Schulte |
| 6,681,820 B2 | 1/2004 | Olofsson |
| 6,711,869 B2 | 3/2004 | Tychsen |
| 6,729,091 B1 | 5/2004 | Martensson |
| 6,745,534 B2 | 6/2004 | Kornfalt |
| 6,763,643 B1 | 7/2004 | Martensson |
| 6,769,219 B2 | 8/2004 | Schwitte et al. |
| 6,769,835 B2 | 8/2004 | Stridsman |
| 6,786,016 B1 | 9/2004 | Wood |
| 6,805,951 B2 | 10/2004 | Kornfalt et al. |
| 6,851,241 B2 | 2/2005 | Pervan |
| 6,854,235 B2 | 2/2005 | Martensson |
| 6,860,074 B2 | 3/2005 | Stanchfield |
| 6,880,305 B2 | 4/2005 | Pervan et al. |
| 6,880,307 B2 | 4/2005 | Schwitte et al. |
| 6,898,913 B2 | 5/2005 | Pervan |
| 6,920,732 B2 | 7/2005 | Martensson |
| 6,931,798 B1 | 8/2005 | Pocai |
| 6,966,161 B2 | 11/2005 | Palsson et al. |
| RE38,950 E | 1/2006 | Maiers et al. |
| 7,021,019 B2 | 4/2006 | Knauseder |
| 7,086,205 B2 | 8/2006 | Pervan |
| 7,121,058 B2 | 10/2006 | Palsson et al. |
| 7,121,059 B2 | 10/2006 | Pervan |
| 7,131,242 B2 | 11/2006 | Martensson |
| 7,152,507 B2 | 12/2006 | Solari |
| 7,210,272 B2 | 5/2007 | Friday |
| 7,332,053 B2 | 2/2008 | Palsson et al. |
| 7,347,328 B2 | 3/2008 | Hartwall |
| 7,398,628 B2 | 7/2008 | Van Horne |
| 7,441,385 B2 | 10/2008 | Palsson et al. |
| 7,451,578 B2 | 11/2008 | Hannig |
| 7,497,058 B2 | 3/2009 | Martensson |
| 7,552,568 B2 | 6/2009 | Palsson et al. |
| 7,603,826 B1 | 10/2009 | Moebus |
| 7,634,884 B2 | 12/2009 | Pervan et al. |
| 7,726,088 B2 | 6/2010 | Muehlebach |
| 7,856,784 B2 | 12/2010 | Martensson |
| 7,877,956 B2 | 2/2011 | Martensson |
| 7,980,039 B2 | 7/2011 | Groeke et al. |
| 7,980,043 B2 | 7/2011 | Moebus |
| 8,028,486 B2 | 10/2011 | Pervan et al. |
| 8,037,657 B2 | 10/2011 | Sjoberg et al. |
| 8,038,363 B2 | 10/2011 | Hannig et al. |
| 8,117,795 B2 | 2/2012 | Knauseder |
| 8,146,318 B2 | 4/2012 | Palsson |
| 8,234,834 B2 | 8/2012 | Martensson et al. |
| 8,276,342 B2 | 10/2012 | Martensson |
| 8,402,709 B2 | 3/2013 | Martensson |
| 2001/0029720 A1 | 10/2001 | Pervan |
| 2002/0007608 A1 | 1/2002 | Pervan |
| 2002/0046526 A1 | 4/2002 | Knauseder |
| 2002/0046528 A1 | 4/2002 | Pervan et al. |
| 2002/0095895 A1 | 7/2002 | Daly et al. |
| 2002/0100242 A1 | 8/2002 | Olofsson |
| 2002/0112433 A1 | 8/2002 | Pervan |
| 2002/0127374 A1 | 9/2002 | Spratling |
| 2002/0148551 A1 | 10/2002 | Knauseder |
| 2002/0178673 A1 | 12/2002 | Pervan |
| 2002/0178674 A1 | 12/2002 | Pervan |
| 2002/0178681 A1 | 12/2002 | Zancai et al. |
| 2002/0178682 A1 | 12/2002 | Pervan |
| 2002/0189747 A1 | 12/2002 | Steinwender |
| 2003/0009972 A1 | 1/2003 | Pervan et al. |
| 2003/0024199 A1 | 2/2003 | Pervan et al. |
| 2003/0033784 A1 | 2/2003 | Pervan |
| 2003/0084634 A1 | 5/2003 | Stanchfield |

(56) References Cited

U.S. PATENT DOCUMENTS

| | | | |
|---|---|---|---|
| 2003/0084636 | A1 | 5/2003 | Pervan |
| 2003/0094230 | A1 | 5/2003 | Sjoberg |
| 2003/0118812 | A1 | 6/2003 | Kornfalt |
| 2003/0141004 | A1 | 7/2003 | Palmblad |
| 2003/0145540 | A1 | 8/2003 | Brunedal |
| 2003/0154678 | A1 | 8/2003 | Stanchfield |
| 2003/0159389 | A1 | 8/2003 | Kornfalt |
| 2003/0224147 | A1 | 12/2003 | Maine et al. |
| 2004/0016197 | A1 | 1/2004 | Ruhdorfer |
| 2004/0031225 | A1 | 2/2004 | Fowler |
| 2004/0031226 | A1 | 2/2004 | Miller |
| 2004/0031227 | A1 | 2/2004 | Knauseder |
| 2004/0040235 | A1 | 3/2004 | Kurtz |
| 2004/0041225 | A1 | 3/2004 | Nemoto |
| 2004/0139678 | A1 | 7/2004 | Pervan |
| 2004/0182036 | A1 | 9/2004 | Sjoberg et al. |
| 2004/0191461 | A1 | 9/2004 | Riccobene |
| 2004/0211143 | A1 | 10/2004 | Hanning |
| 2005/0034405 | A1 | 2/2005 | Pervan |
| 2005/0144881 | A1 | 7/2005 | Tate |
| 2005/0166526 | A1 | 8/2005 | Stanchfield |
| 2005/0210810 | A1 | 9/2005 | Pervan |
| 2005/0252130 | A1 | 11/2005 | Martensson |
| 2006/0101769 | A1 | 5/2006 | Pervan |
| 2006/0236642 | A1 | 10/2006 | Pervan |
| 2006/0248836 | A1 | 11/2006 | Martensson |
| 2007/0006543 | A1 | 1/2007 | Engstrom |
| 2007/0028547 | A1 | 2/2007 | Grafenauer et al. |
| 2007/0240376 | A1 | 10/2007 | Engstrom |
| 2008/0000186 | A1 | 1/2008 | Pervan |
| 2008/0134613 | A1 | 6/2008 | Pervan |
| 2008/0216434 | A1 | 9/2008 | Pervan |
| 2008/0236088 | A1 | 10/2008 | Hannig |
| 2008/0271403 | A1 | 11/2008 | Palsson |
| 2009/0019806 | A1 | 1/2009 | Muehlebach |
| 2009/0064624 | A1 | 3/2009 | Sokol |
| 2009/0100782 | A1 | 4/2009 | Groeke et al. |
| 2009/0193748 | A1 | 8/2009 | Boo et al. |
| 2009/0199500 | A1 | 8/2009 | LeBlang |
| 2009/0217615 | A1 | 9/2009 | Engstrom |
| 2010/0031599 | A1 | 2/2010 | Kennedy et al. |
| 2010/0043333 | A1 | 2/2010 | Hannig |
| 2010/0058700 | A1 | 3/2010 | LeBlang |
| 2011/0167751 | A1 | 7/2011 | Engstrom |
| 2011/0173914 | A1 | 7/2011 | Engstrom |
| 2011/0271631 | A1 | 11/2011 | Engstrom |
| 2011/0271632 | A1 | 11/2011 | Cappelle et al. |
| 2012/0042595 | A1 | 2/2012 | De Boe |
| 2012/0055112 | A1 | 3/2012 | Engstrom |
| 2012/0216472 | A1 | 8/2012 | Martensson et al. |
| 2012/0233948 | A1 | 9/2012 | Palsson |
| 2012/0247053 | A1 | 10/2012 | Martensson |
| 2012/0291396 | A1 | 11/2012 | Martensson |
| 2012/0304590 | A1 | 12/2012 | Engstrom |
| 2013/0042555 | A1 | 2/2013 | Martensson |
| 2013/0067840 | A1 | 3/2013 | Martensson |

FOREIGN PATENT DOCUMENTS

| | | |
|---|---|---|
| AU | 200020703 | 6/2000 |
| BE | 417526 | 12/1936 |
| BE | 557844 | 3/1960 |
| BE | 1010339 | 6/1998 |
| BE | 1010487 | 10/1998 |
| CA | 991373 | 6/1976 |
| CA | 1169106 | 6/1984 |
| CA | 2226286 | 12/1997 |
| CA | 2252791 | 5/1999 |
| CA | 2289309 | 11/1999 |
| CH | 200949 | 1/1939 |
| CH | 211677 | 1/1941 |
| CH | 211877 | 1/1941 |
| CH | 562 377 | 5/1975 |
| DE | 209979 | 11/1906 |
| DE | 1212275 | 3/1966 |
| DE | 1985418 | 5/1968 |
| DE | 1534802 | 4/1970 |
| DE | 7102476 | 6/1971 |
| DE | 1534278 | 11/1971 |
| DE | 2101782 | 7/1972 |
| DE | 2145024 | 3/1973 |
| DE | 2159042 | 6/1973 |
| DE | 2238660 | 2/1974 |
| DE | 2251762 | 5/1974 |
| DE | 7402354 | 5/1974 |
| DE | 2502992 | 7/1976 |
| DE | 2616077 | 10/1977 |
| DE | 2917025 | 11/1980 |
| DE | 3104519 | 2/1981 |
| DE | 3041781 | 6/1982 |
| DE | 3214207 | 11/1982 |
| DE | 3246376 | 6/1984 |
| DE | 3304992 | 8/1984 |
| DE | 3306609 | 9/1984 |
| DE | 3343601 | 6/1985 |
| DE | 8604004 | 4/1986 |
| DE | 3512204 | 10/1986 |
| DE | 3544845 | 6/1987 |
| DE | 3631390 | 12/1987 |
| DE | 3640822 | 6/1988 |
| DE | 8600241 | 4/1989 |
| DE | 4002547-0 | 8/1991 |
| DE | 3932980 | 11/1991 |
| DE | 9300306 | 3/1993 |
| DE | 4134452 | 4/1993 |
| DE | 4215273 | 11/1993 |
| DE | 4242530 | 6/1994 |
| DE | 43 44 089 | 7/1994 |
| DE | 9317191 | 3/1995 |
| DE | 296 14 086 | 10/1996 |
| DE | 29703962 | 6/1997 |
| DE | 29710175 | 8/1997 |
| DE | 29711960 | 10/1997 |
| DE | 19651149 | 6/1998 |
| DE | 19709641 | 9/1998 |
| DE | 19821938 | 11/1999 |
| DE | 20001225 | 7/2000 |
| DE | 19925248 | 12/2000 |
| DE | 20018284 | 1/2001 |
| DE | 20017461 | 2/2001 |
| DE | 20027461 | 3/2001 |
| DE | 100 01 076 | 10/2001 |
| DE | 517353 | 5/2002 |
| DE | 10062873 | 7/2002 |
| DE | 10131248 | 1/2003 |
| DE | 10 2005 022 297.9 | 8/2005 |
| DE | 10 2007 035 648 | 1/2009 |
| DE | 2009 022 483.1 | 5/2009 |
| DE | 20 2009 004 530 | 6/2009 |
| DE | 10 2010 004717.1 | 1/2010 |
| DE | 10 2009 038 750 | 3/2011 |
| EP | 0085196 | 8/1983 |
| EP | 0248127 | 12/1987 |
| EP | 0220389 | 5/1992 |
| EP | 0623724 | 11/1994 |
| EP | 0652340 | 5/1995 |
| EP | 0698162 | 2/1996 |
| EP | 000711886 | 5/1996 |
| EP | 813641 | 12/1997 |
| EP | 0843763 | 5/1998 |
| EP | 0849416 | 6/1998 |
| EP | 0855482 | 7/1998 |
| EP | 0877130 | 11/1998 |
| EP | 0903451 | 3/1999 |
| EP | 0958441 | 11/1999 |
| EP | 0969163 | 1/2000 |
| EP | 0969164 | 1/2000 |
| EP | 0974713 | 1/2000 |
| EP | 1229181 | 8/2002 |
| EP | 2400076 | 8/2004 |
| EP | 2 034 106 | 3/2009 |
| FI | 843060 | 8/1984 |
| FR | 557844 | 8/1923 |

(56) References Cited

FOREIGN PATENT DOCUMENTS

| | | |
|---|---|---|
| FR | 1175582 | 3/1959 |
| FR | 1215852 | 4/1960 |
| FR | 1293043 | 5/1962 |
| FR | 2568295 | 1/1986 |
| FR | 2630149 | 10/1989 |
| FR | 2637932 | 4/1990 |
| FR | 2675174 | 10/1992 |
| FR | 2691491 | 11/1993 |
| FR | 2891491 | 11/1993 |
| FR | 2691691 | 12/1993 |
| FR | 2697275 | 4/1994 |
| FR | 2712329 | 5/1995 |
| FR | 2781513 | 1/2000 |
| FR | 2785633 | 5/2000 |
| FR | 2810060 | 12/2001 |
| GB | 424057 | 2/1935 |
| GB | 585205 | 1/1947 |
| GB | 599793 | 3/1948 |
| GB | 636423 | 4/1950 |
| GB | 812671 | 4/1959 |
| GB | 1212983 | 11/1970 |
| GB | 1237744 | 6/1971 |
| GB | 1348272 | 3/1974 |
| GB | 1430423 | 3/1976 |
| GB | 2117813 | 10/1983 |
| GB | 2126106 | 3/1984 |
| GB | 2142670 | 1/1985 |
| GB | 2168732 | 6/1986 |
| GB | 2228753 | 9/1990 |
| GB | 2243381 | 10/1991 |
| GB | 2256023 | 11/1992 |
| IT | 812671 | 4/1959 |
| JP | 5465528 | 5/1979 |
| JP | 57119056 | 7/1982 |
| JP | 64-14838 | 1/1989 |
| JP | 64-14839 | 1/1989 |
| JP | 02285145 | 11/1990 |
| JP | 3-18343 | 2/1991 |
| JP | 3-44645 | 4/1991 |
| JP | 3046645 | 4/1991 |
| JP | 3169967 | 7/1991 |
| JP | 4106264 | 4/1992 |
| JP | 4191001 | 7/1992 |
| JP | 04261955 A * | 9/1992 |
| JP | 5148984 | 6/1993 |
| JP | 6-146553 | 5/1994 |
| JP | 656310 | 8/1994 |
| JP | 6320510 | 11/1994 |
| JP | 752103 | 2/1995 |
| JP | 407052103 | 2/1995 |
| JP | 7076923 | 3/1995 |
| JP | 7180333 | 7/1995 |
| JP | 7229276 | 8/1995 |
| JP | 7279366 | 10/1995 |
| JP | 7300979 | 11/1995 |
| JP | 7310426 | 11/1995 |
| JP | 8086078 | 4/1996 |
| NL | 7601773 | 2/1975 |
| NO | 157871 | 7/1984 |
| NO | 305614 | 5/1995 |
| PL | 26931 | 6/1989 |
| SE | 372051 | 12/1974 |
| SE | 7114900-9 | 12/1974 |
| SE | 7706470 | 12/1978 |
| SE | 450141 | 6/1987 |
| SE | 8206934-5 | 6/1987 |
| SE | 457737 | 1/1989 |
| SE | 462809 | 4/1990 |
| SE | 467150 | 6/1992 |
| SE | 501014 | 10/1994 |
| SE | 9301595-6 | 10/1994 |
| SE | 502994 | 3/1996 |
| SE | 503861 | 9/1996 |
| SE | 509059 | 11/1998 |
| SE | 509060 | 11/1998 |
| SE | 9800311-4 * | 9/1999 |
| SE | 512290 | 2/2000 |
| SE | 512313 | 2/2000 |
| SE | 513151 C2 * | 7/2000 |
| SE | 513189 | 7/2000 |
| SE | 514645 | 3/2001 |
| SE | 0001149 | 10/2001 |
| SU | 363795 | 11/1973 |
| WO | WO 80/02155 | 10/1980 |
| WO | WO 84/02155 | 6/1984 |
| WO | WO 8703839 | 7/1987 |
| WO | WO 9217657 | 10/1992 |
| WO | WO 93/13280 | 7/1993 |
| WO | WO 9401628 | 1/1994 |
| WO | WO 96/12857 | 5/1996 |
| WO | WO 96/23942 | 8/1996 |
| WO | WO 9627719 | 9/1996 |
| WO | WO 9630177 | 10/1996 |
| WO | WO 9822678 | 5/1998 |
| WO | WO 9824994 | 6/1998 |
| WO | WO 9824995 | 6/1998 |
| WO | WO 9858142 | 12/1998 |
| WO | WO 9901628 | 1/1999 |
| WO | WO 9940273 | 8/1999 |
| WO | WO 9940273 A1 * | 8/1999 |
| WO | WO 9966151 | 12/1999 |
| WO | WO 9966152 | 12/1999 |
| WO | WO 0002214 | 1/2000 |
| WO | WO 0006854 | 2/2000 |
| WO | WO 00/20705 | 4/2000 |
| WO | WO 00/47841 | 8/2000 |
| WO | WO 0056802 | 9/2000 |
| WO | WO 0063510 | 10/2000 |
| WO | WO 0066856 | 11/2000 |
| WO | WO 01/02669 | 1/2001 |
| WO | WO 0120101 | 3/2001 |
| WO | WO 01/31141 | 5/2001 |
| WO | WO 01/51732 | 7/2001 |
| WO | WO 01/51733 | 7/2001 |
| WO | WO 01/75247 | 10/2001 |
| WO | WO 02/081843 | 10/2002 |
| WO | WO 03/083234 | 10/2003 |
| WO | WO 03093686 | 11/2003 |
| WO | WO 2005/040521 | 5/2005 |
| WO | WO 2005/054599 | 6/2005 |
| WO | WO 2005/059269 | 6/2005 |
| WO | WO 2006/043893 | 4/2006 |
| WO | WO 2007/008139 | 1/2007 |
| WO | WO 2007/089186 | 8/2007 |
| WO | WO 2007/141605 | 12/2007 |
| WO | WO 2008/004960 | 1/2008 |
| WO | WO 2008/068245 | 6/2008 |
| WO | WO 2009/066153 | 5/2009 |
| WO | WO 2009/139687 | 11/2009 |
| WO | WO 2010/082171 | 7/2010 |
| WO | WO 2010/136171 | 12/2010 |
| WO | WO 2011/085788 | 7/2011 |

OTHER PUBLICATIONS

Non-Final Office Action for U.S. Appl. No. 10/270,163 dated Dec. 10, 2004.
Final Office Action for U.S. Appl. No. 10/270,163 dated Jun. 2, 2005.
Non-Final Office Action for U.S. Appl. No. 10/270,163 dated Dec. 14, 2005.
Final Office Action for U.S. Appl. No. 10/270,163 dated May 25, 2006.
Non-Final Office Action for U.S. Appl. No. 11/185,724 dated Sep. 26, 2006.
Non-Final Office Action for U.S. Appl. No. 11/483,636 dated Oct. 11, 2006.
Non-Final Office Action for U.S. Appl. No. 11/185,724 dated Apr. 19, 2007.
Non-Final Office Action for U.S. Appl. No. 11/483,636 dated Apr. 19, 2007.
Non-Final Office Action for U.S. Appl. No. 11/015,741 dated Sep. 6, 2007.
Non-Final Office Action for U.S. Appl. No. 11/242,127 dated Nov. 1, 2007.

(56) References Cited

OTHER PUBLICATIONS

Non-Final Office Action for U.S. Appl. No. 11/185,724 dated Jan. 9, 2008.
Final Office Action for U.S. Appl. No. 11/015,741 dated Feb. 26, 2008.
Non-Final Office Action for U.S. Appl. No. 11/483,636 dated Apr. 3, 2008.
Non-Final Office Action for U.S. Appl. No. 11/242,127 dated Apr. 29, 2008.
Examiner Interview Summary for U.S. Appl. No. 11/015,741 dated May 7, 2008.
Final Office Action for U.S. Appl. No. 11/185,724 dated Jul. 9, 2008.
Non-Final Office Action for U.S. Appl. No. 10/580,191 dated Jul. 16, 2008.
Final Office Action for U.S. Appl. No. 11/483,636 dated Nov. 20, 2008.
Non-Final Office Action for U.S. Appl. No. 11/242,127 dated Mar. 31, 2009.
Non-Final Office Action for U.S. Appl. No. 12/010,587 dated Jun. 23, 2009.
Non-Final Office Action for U.S. Appl. No. 11/483,636 dated Jul. 21, 2009.
Examiner Interview Summary for U.S. Appl. No. 11/185,724 dated Aug. 13, 2009.
Non-Final Office Action for U.S. Appl. No. 12/278,274 dated Sep. 24, 2009.
Final Office Action for U.S. Appl. No. 11/242,127 dated Nov. 24, 2009.
Non-Final Office Action for U.S. Appl. No. 10/580,191 dated Mar. 10, 2010.
Non-Final Office Action for U.S. Appl. No. 11/483,636 dated Mar. 17, 2010.
Final Office Action for U.S. Appl. No. 12/278,274 dated May 17, 2010.
Final Office Action for U.S. Appl. No. 12/010,587 dated May 25, 2010.
Final Office Action for U.S. Appl. No. 10/580,191 dated Oct. 6, 2010.
Non-Final Office Action for U.S. Appl. No. 12/278,274 dated Nov. 2, 2010.
Non-Final Office Action for U.S. Appl. No. 11/483,636 dated Dec. 7, 2010.
Non-Final Office Action for U.S. Appl. No. 12/010,587 dated Mar. 16, 2011.
Final Office Action for U.S. Appl. No. 12/278,274 dated Apr. 14, 2011.
Final Office Action for U.S. Appl. No. 11/483,636 dated May 24, 2011.
Non-Final Office Action for U.S. Appl. No. 13/048,646 dated May 25, 2011.
Non-Final Office Action for U.S. Appl. No. 12/966,861 dated Jul. 20, 2011.
Non-Final Office Action for U.S. Appl. No. 12/979,086 dated Aug. 3, 2011.
Non-Final Office Action for U.S. Appl. No. 12/010,587 dated Aug. 30, 2011.
Non-Final Office Action for U.S. Appl. No. 11/483,636 dated Sep. 28, 2011.
Final Office Action for U.S. Appl. No. 13/048,646 dated Nov. 1, 2011.
Final Office Action for U.S. Appl. No. 12/966,861 dated Jan. 20, 2012.
Final Office Action for U.S. Appl. No. 12/979,086 dated Jan. 25, 2012.
Final Office Action for U.S. Appl. No. 11/483,636 dated Feb. 7, 2012.
Non-Final Office Action for U.S. Appl. No. 12/966,797 dated Feb. 29, 2012.
Notice of Allowance for U.S. Appl. No. 12/966,861 dated Apr. 11, 2012.
Non-Final Office Action for U.S. Appl. No. 13/437,597 dated Jul. 9, 2012.
Notice of Allowance for U.S. Appl. No. 12/979,086 dated Jul. 19, 2012.
Non-Final Office Action for U.S. Appl. No. 12/747,454 dated Aug. 6, 2012.
Final Office Action for U.S. Appl. No. 12/966,797 dated Aug. 8, 2012.
Non-Final Office Action for U.S. Appl. No. 13/452,183 dated Aug. 8, 2012.
Non-Final Office Action for U.S. Appl. No. 13/567,933 dated Sep. 12, 2012.
Non-Final Office Action for U.S. Appl. No. 11/483,636 dated Oct. 10, 2012.
Advisory Action for U.S. Appl. No. 12/966,797 dated Oct. 18, 2012.
Notice of Allowance for U.S. Appl. No. 13/437,597 dated Oct. 26, 2012.
Non-Final Office Action for U.S. Appl. No. 13/086,931 dated Nov. 7, 2012.
Non-Final Office Action for U.S. Appl. No. 13/492,512, dated Nov. 21, 2012.
Non-Final Office Action for U.S. Appl. No. 13/463,329 dated Nov. 21, 2012.
Notice of Allowance for U.S. Appl. No. 11/483,636 dated Nov. 23, 2012.
Notice of Allowance for U.S. Appl. No. 10/270,163 dated Dec. 13, 2012.
Non-Final Office Action for U.S. Appl. No. 12/966,797 dated Dec. 13, 2012.
Non-Final Office Action for U.S. Appl. No. 13/559,230 dated Dec. 20, 2012.
Non-Final Office Action for U.S. Appl. No. 13/675,936 dated Dec. 31, 2012.
Notice of Allowability for U.S. Appl. No. 11/483,636 dated Jan. 3, 2013.
Notice of Allowance for U.S. Appl. No. 12/747,454 dated Jan. 8, 2013.
Notice of Allowance for U.S. Appl. No. 13/437,597 dated Jan. 9, 2013.
Final Office Action for U.S. Appl. No. 12/010,587 date Jan. 28, 2013.
Non-Final Office Action for U.S. Appl. No. 13/620,098 dated Feb. 8, 2013.
Non-Final Office Action for U.S. Appl. No. 13/492,512 dated Feb. 26, 2013.
Non-Final Office Action for U.S. Appl. No. 11/015,741 dated Mar. 13, 2013.
Final Office Action for U.S. Appl. No. 13/567,933 dated Mar. 15, 2013.
Notice of Allowance for U.S. Appl. No. 11/242,127 dated Apr. 26, 2013.
Notice of Allowance for U.S. Appl. No. 13/437,597 dated Apr. 29, 2013.
Non-Final Office Action for U.S. Appl. No. 12/747,454 dated May 10, 2013.
Notice of Allowance for U.S. Appl. No. 11/185,724 dated May 20, 2013.
Non-Final Office Action for U.S. Appl. No. 13/559,242 dated Jun. 7, 2013.
Corrected Notice of Allowability for U.S. Appl. No. 11/185,724 dated Aug. 1, 2013.
Final Office Action for U.S. Appl. No. 13/086,931 dated Aug. 5, 2013.
Notice of Allowance for U.S. Appl. No. 12/966,797 dated Aug. 7, 2013.
Notice of Allowance for U.S. Appl. No. 12/010,587 dated Aug. 14, 2013.
Notice of Allowance for U.S. Appl. No. 13/559,230 dated Aug. 20, 2013.
Non-Final Office Action for U.S. Appl. No. 13/860,315 dated Aug. 26, 2013.

\* cited by examiner

GUIDING MEANS AT A JOINT

CROSS REFERENCE TO RELATED APPLICATIONS

This application is a continuation of U.S. Ser. No. 09/910,960, filed Jul. 24, 2001, now U.S. Pat. No. 7,992,358 issued Aug. 9, 2011, which in turn is a continuation-in-part (CIP) of U.S. Ser. No. 09/601,573, filed Aug. 4, 2000 now abandoned, which is a 35 U.S.C. §371 application of International Application No. PCT/SE99/00128, filed Feb. 1, 1999 which claims priority of Swedish Patent Application No. 9800311-4, filed Feb. 4, 1998; and is related to U.S. Ser. No. 09/661,627, filed Sep. 13, 2000, now U.S. Pat. No. 6,682,254, the entire disclosures of which are herein incorporated by reference.

The present invention relates to a guiding means at a joint comprising groove and tenon, preferably intended to be joined with glue.

Prefabricated floorboards which at their edges are provided with groove and tenon are well known nowadays. As these are very easy to install it is possible for the normal handy man to achieve this. These type of floors can be constituted of massive wood, fibre board or particle board. These are often provided with a surface layer, such as lacquer or some sort of laminate. The boards are most often installed by gluing them together via their groove and tenon. It is desired to join the separate boards so closely that the joint becomes practically invisible, which increases the moisture resistance radically. The usable life of the installed floor is hereby also increased. In order to achieve a tight joint, it is essential that glue is used excessively. The clearance in the joint will therefore have to be relatively large in order to be able to force the boards together without having to use special equipment due to the forces that would be needed otherwise. A to small clearance will cause a hydraulic resistance caused by the glued captured inside the groove during the joining. The clearance needed will however cause a random discrepancy in the levels between adjacent floorboards. This discrepancy in levels will lead to an increased wear at the joint and that moisture may penetrate the joint. The decorative wear layer, often constituted by lacquer or laminate will hereby often be worn down closest to the joint. The wood fibre will hereby be naked closest to the joint, which in addition to be being unsightly also may cause the fibres to swell when exposed to moisture. This causes the surface layer to rise closest to the edges whereby these edges will be exposed to further wear, which will decrease the useful life of the floor radically.

It has, through the present invention, quite unexpectedly been possible to solve the above mentioned problems so that the risk for error during installation is radically reduced, whereby the average usable life of the floor, with a guiding means according to the present invention, is considerably increased. Accordingly, the invention relates to a guiding means at a joint comprising groove and tenon preferably intended to be joined with glue. The invention is characterised in that the tenon and/or groove includes guiding wedges. The guiding means preferably forms a part of boards intended to, together form a floor. The core of the boards is constituted by a fibre board or a particle board. At least the upper side of the board is constituted by a decorative thermosetting laminate. The fitting clearance between the tenon and the groove includes a first fitting clearance and a second, guiding, fitting clearance. The second, guiding, fitting clearance is obtained through the guiding wedges. The first fitting clearance comprises the main part of the fit and the second, guiding fitting clearance comprises a smaller part of the fit. The first fitting clearance is in the range 0.1-1 mm, preferably 0.1-0.5 mm, while the second, guiding, fitting clearance is in the range 0.01-0.2 mm, preferably 0.02-0.1 mm.

According to one embodiment of the invention the guiding wedges are arranged perpendicular to the extension of the joint.

According to another embodiment of the invention the guiding wedges are arranged parallel to the extension of the joint.

The surfaces of the joint is provided with recesses so that cavities are formed in the joint. The cavities are intended to receive the glue used during the joining.

The invention is further illustrated together with enclosed figures showing different embodiments of the invention whereby.

Figure 1:
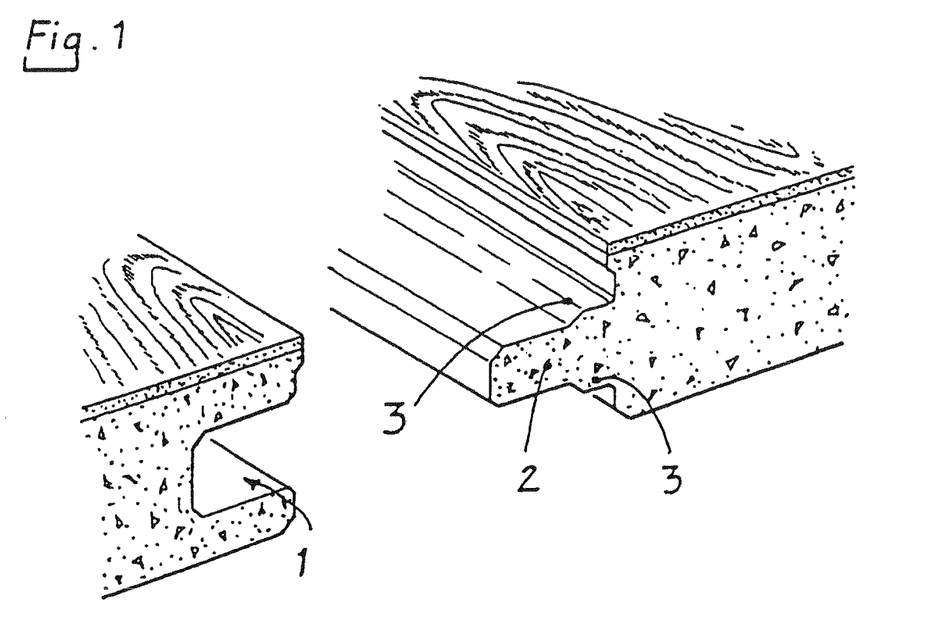
FIG. 1 shows, in perspective view, a first embodiment of a guiding means at a joint, according to the invention.

Accordingly, FIG. 1 shows, in perspective view seen from above, a first embodiment of a guiding means at a joint according to the invention. The guiding means comprises groove 1 and tenon 2 which usually is intended to be joined by using glue. The tenon 2 comprises guiding wedges 3 on the upper and lower sides. The fitting clearance between the groove 1 and tenon 2 includes a first and a second, guiding, fitting clearance, which second, guiding, fitting clearance is obtained by the guiding wedges 3. The first fitting clearance forms the main part of the fit while the second, guiding, fitting clearance forms a smaller part of the fit. The first fitting clearance is approximately 0.2 mm while the second, guiding fitting clearance is approximately 0.05 mm. The guiding wedges 3 are arranged parallel to the extension of the joint. The same embodiment is shown assembled in FIG. 2.

Figure 2:
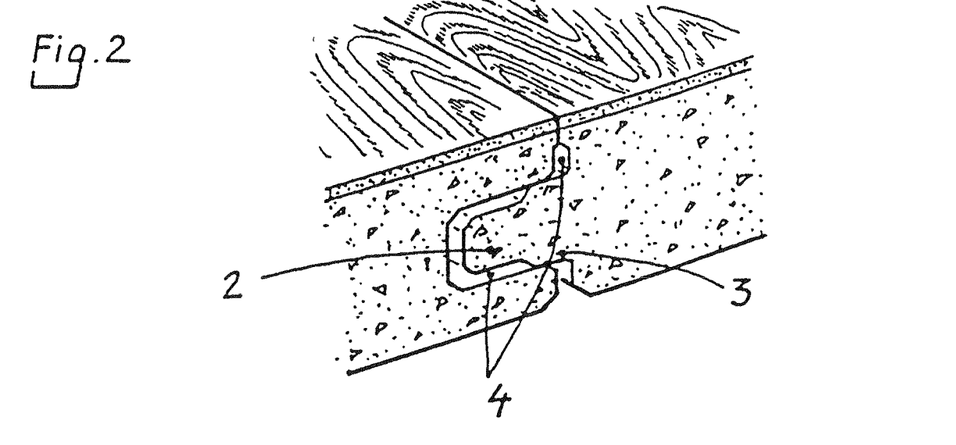
FIG. 2 shows, in perspective view, the embodiment form FIG. 1 after assembly.

The respective surfaces of the joint are provided with recesses so that cavities 4 are formed in the joint. The cavities 4 are intended to receive the glue used at the assembly. The guiding means comprises a part of boards intended to, together form a floor whereby the core of the board is constituted by fibre board or a particle board and at least the upper side of the board is constituted by a decorative thermosetting laminate.

Figure 3:
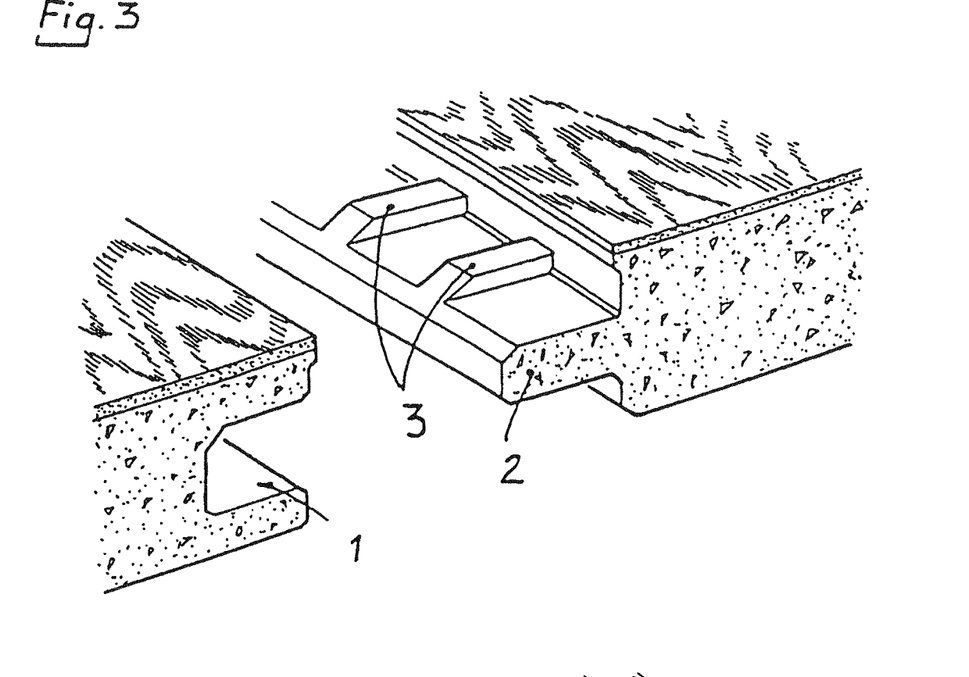
FIG. 3 shows, in perspective view, a second embodiment of a guiding means at a joint, according to the invention.

FIG. 3 shows, in perspective view seen aslant from above, a second embodiment of a guiding means at a joint, according to the invention. The embodiment conforms in the main with the one described in connection to FIGS. 1 and 2. The tenon 2 is, however, provided with guiding wedges arranged perpendicularly to the extension of the joint.

Figure 4:
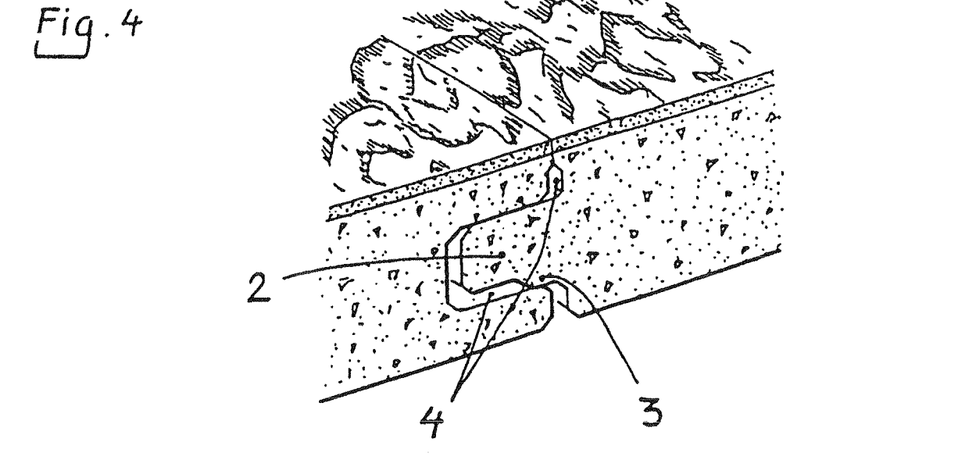
FIG. 4 shows, in perspective view, a third embodiment of a guiding means at a joint, according to the invention.

FIG. 4 shows, in perspective view seen aslant from above, a third embodiment of a guiding means at a joint, according to the invention. The embodiment is shown assembled. The embodiment corresponds in the main to the one described in connection to FIGS. 1 and 2, the tenon 2 is however provided with guiding wedges 3 only at the lower side.

The invention is not limited by the embodiments shown since these can varied in different ways within the scope of the invention. Guiding wedges 3 can, for example, be arranged inside the groove 1. If these guiding wedges 3 are parallel to the extension of the joint, they are suitably arranged in the bottom of the groove 1 while they can be given a shape similar to the one shown in FIG. 3 if they are arranged perpendicularly to extension of the joint.

We claim:

1. A surface comprising:
a first board comprising an upper surface and a core, said board being bounded by one or more first edges; in combination with
a second board comprising an upper surface and a core, said second board being bounded by one or more second edges, and said second board comprising a tenon, the tenon having a distal end remote from said core, an upper side, and a lower side, and the tenon protruding with its distal end past the second edge, wherein the upper side of the tenon adjoins in distal direction a downwardly inclined surface at the distal end of the tenon;
wherein the first and second board, when assembled to form the surface, define a joint longitudinally extending between the boards;
wherein said tenon of the second board comprises one or more protruding element arranged along said upper side or said lower side of said tenon and locally protruding from said upper side or said lower side, the one or more protruding element being configured to guide said tenon into engagement with a groove wall such that said one or more protruding element is in contact with said groove wall, thereby defining one or more local contact points, wherein directly adjacent the one or more protruding elements at least one clearance is formed between the tenon and the groove wall in the engaged condition of the tenon and the groove wall;
wherein the first and second boards at said joint are configured to mutually interact in a horizontal direction between the boards;
wherein the one or more protruding elements is made in one piece with the tenon; and
wherein the upper or lower side of the tenon comprising the one or more protruding elements comprises a substantially flat portion, wherein each of the one or more protruding elements in a direction along the extension of the joint covers only a confined portion of the tenon such that the portion of the tenon covered with the one or more protruding elements is smaller than the remaining portion of the upper or lower side of the tenon comprising the one or more protruding elements.

2. The surface of claim 1, wherein the one or more and protruding elements comprise a wedge shaped portion.

3. A surface comprising:
a first board comprising an upper surface and a core, and bounded by one or more first edges, at least one of the first edges comprising a groove; in combination with
a second board comprising an upper surface and a core, and bounded by one or more second edges, said second board comprising a tenon, the tenon having a distal end remote from said core, and the tenon extending from the second board and past the second edge;
wherein the first and second boards, when assembled to form the surface, define a joint longitudinally extending between the boards;
wherein the tenon of the second board comprises a plurality of protruding elements spaced apart along the extension of the joint, each of the plurality of protruding elements being arranged substantially perpendicularly to the extension of the joint, the protruding elements being configured to engage an opposing wall of said groove;
wherein the joint and tenon allow the surface formed by the boards to mutually interact in a horizontal direction between the boards;
wherein in the assembled condition of the boards, clearances are formed between each of the protruding elements, each of the clearances having a width along the extension of the joint;
wherein the protruding elements are made in one piece with the tenon;
wherein the protruding elements each have an upper side comprising a generally flat portion and a width along the extension of the joint, wherein the upper side of the protruding elements is directed upwards; and
wherein the width of the protruding elements is smaller than the width of the clearances.

4. The surface of claim 3, wherein the protruding elements comprise wedge shaped portions.

* * * * *